(12) United States Patent
Fukino

(10) Patent No.: US 8,325,431 B2
(45) Date of Patent: Dec. 4, 2012

(54) LENS BARREL AND IMAGE CAPTURING APPARATUS

(75) Inventor: Kunihiro Fukino, Fujisawa (JP)

(73) Assignee: Nikon Corporation, Tokyo (JP)

( * ) Notice: Subject to any disclaimer, the term of this patent is extended or adjusted under 35 U.S.C. 154(b) by 156 days.

(21) Appl. No.: 12/710,656

(22) Filed: Feb. 23, 2010

(65) Prior Publication Data

US 2010/0214666 A1 Aug. 26, 2010

(30) Foreign Application Priority Data

Feb. 24, 2009 (JP) .................................. 2009-041396
Feb. 24, 2009 (JP) .................................. 2009-041398

(51) Int. Cl.
*G02B 7/02* (2006.01)

(52) U.S. Cl. ...................................................... 359/824

(58) Field of Classification Search .......... 359/822–824, 359/694, 699
See application file for complete search history.

(56) References Cited

U.S. PATENT DOCUMENTS

| 5,337,187 A | 8/1994 | Fukino et al. |
| 2002/0030422 A1* | 3/2002 | Hata ......................... 310/323.17 |
| 2009/0001852 A1 | 1/2009 | Ashizawa |

FOREIGN PATENT DOCUMENTS

| JP | A-5-142475 | 6/1993 |
| JP | A-2000-89086 | 3/2000 |
| JP | A-2008-312438 | 12/2008 |

* cited by examiner

*Primary Examiner* — Joseph P Martinez
(74) *Attorney, Agent, or Firm* — Oliff & Berridge, PLC

(57) ABSTRACT

Provided is a lens barrel comprising a fixed cylinder; an optical system having a first optical component that moves relative to the fixed cylinder; a first holding frame that holds the first optical component; a guide axle that is connected to the first holding frame and that extends parallel to an optical axis of the optical system; a linear drive unit operable to move the guide axle in the direction of the optical axis and to fix the position of the guide axle; and a holding cylinder that holds the linear drive unit, the holding cylinder being fixed to the fixed cylinder with respect to the direction of the optical axis when the linear drive unit moves the guide axle and moving relative to the fixed cylinder in the direction of the optical axis when the linear drive unit holds the guide axle.

31 Claims, 9 Drawing Sheets

US 8,325,431 B2

LENS BARREL AND IMAGE CAPTURING APPARATUS

BACKGROUND

1. Technical Field

The present invention relates to a lens barrel and an image capturing apparatus.

The present application claims priority from Japanese Patent Applications No. 2009-41396 and 2009-41398 filed on Feb. 24, 2009, the contents of which are incorporated herein by reference.

2. Related Art

Japanese Patent Application Publication No. 2000-089086 discloses a configuration of an internal focusing zoom lens barrel in which a plurality of lenses move individually via a cam mechanism to change focal position and focal distance. Japanese Patent Application Publication No. 5-142475 discloses a lens, from among the lenses of a zoom lens, that moves in the direction of the optical axis in response to a scaling operation and rotates in response to a focusing operation.

However, this requires a complicated configuration with many components and there are many steps to the assembly, and is therefore unsuitable for mass production. Furthermore, the ability of the lens barrel is greatly impacted by the accuracy of the components, the precision of the assembly, and the like, which means that improving the ability of the lens barrel incurs a high cost. Yet further, when a configuration is adopted in which holding frames that hold the lenses in the zoom lens move while engaged with guide axles, there is a mechanical limitation that these holding frames cannot be rotated by the focusing operation.

SUMMARY

According to a first aspect related to the innovations herein, one exemplary lens barrel may comprise: a fixed cylinder; an optical system having a first optical component that moves relative to the fixed cylinder; a first holding frame that holds the first optical component; a guide axle that is connected to the first holding frame and that extends parallel to an optical axis of the optical system; a linear drive unit operable to move the guide axle in the direction of the optical axis and to fix the position of the guide axle; and a holding cylinder that holds the linear drive unit, the holding cylinder being fixed to the fixed cylinder with respect to the direction of the optical axis when the linear drive unit moves the guide axle and moving relative to the fixed cylinder in the direction of the optical axis when the linear drive unit holds the guide axle.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
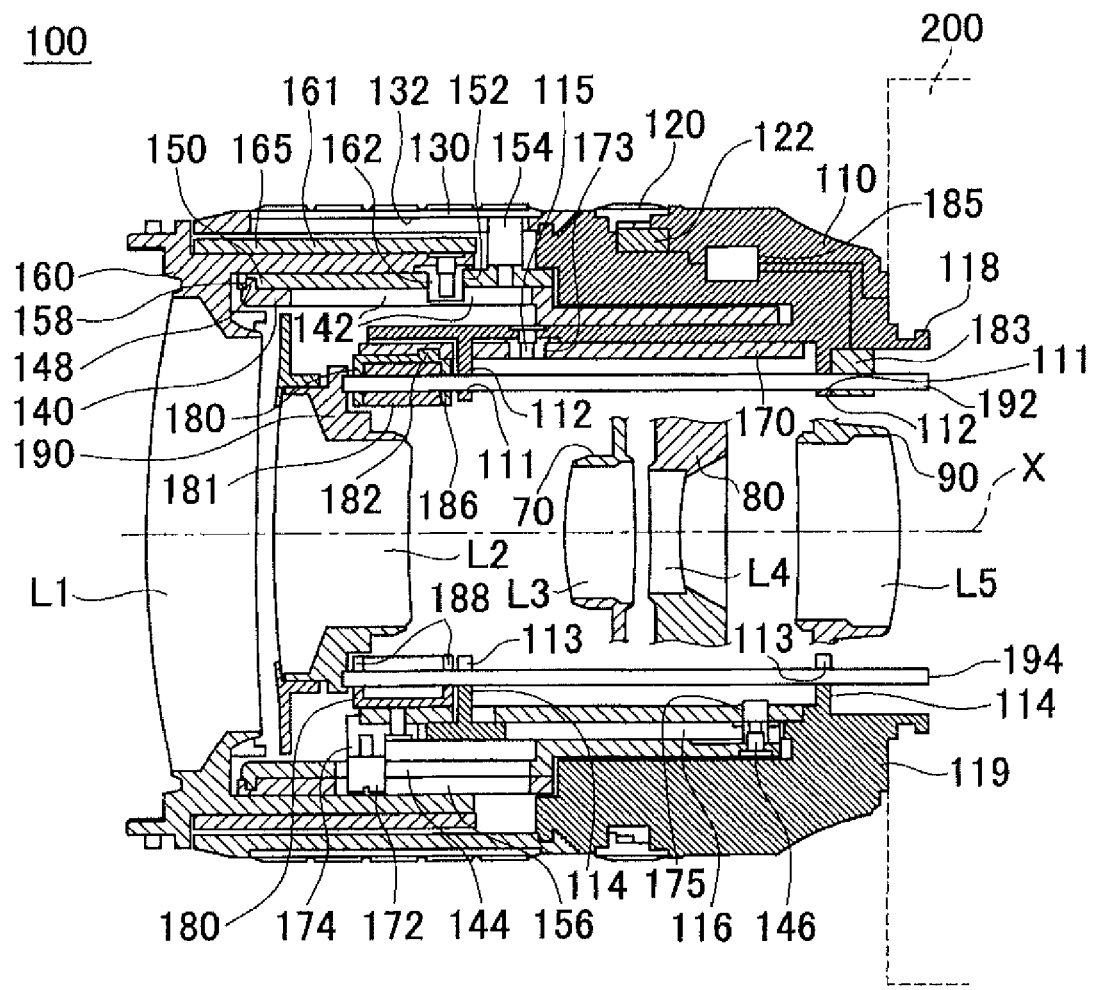
FIG. 1 is a cross-sectional view of a lens barrel 100 scaled as a wide angle lens.

FIG. 1 is a cross-sectional view of a lens barrel 100. The lens barrel 100 is provided with five lenses L1, L2, L3, L4, and L5 arranged in order on a common optical axis X. The lenses L1 to L5 are held respectively by lens frames 160, 190, 70, 80, and 90. This lens barrel 100 is an internal focusing zoom lens, and FIG. 1 shows the lens barrel 100 is in a wide angle state.

The lens barrel 100 includes a fixed cylinder 110 that is fixed to an image capturing unit 200 having an image sensor or the like. An inner cylinder 140, a middle cylinder 150, an outer cylinder 161, and a zoom ring 130 are arranged in the stated order, beginning with the innermost, in the outer periphery of the front end of the fixed cylinder 110.

A focus ring 120 is arranged on the outer side of the fixed cylinder 110 in a manner to be rotatable. A cam cylinder 170 arranged to be rotatable relative to the fixed cylinder 110 is provided on the inner side of the fixed cylinder 110, and a pair of guide bars 192 and 194 are arranged parallel to the optical axis X on the inner side of the cam cylinder 170.

The fixed cylinder 110 includes a mount 118 on the rear end thereof, which corresponds to the right end in FIG. 1. The fixed cylinder 110 is joined to the image capturing unit 200 via the mount 118, such that a mount surface 119 at the rear end of the fixed cylinder 110 closely contacts a front surface of the image capturing unit 200. In this way, the position of the entire lens barrel 100 can be fixed relative to the image capturing unit 200.

The inner cylinder 140 includes linear grooves 142 arranged in the direction of the optical axis X, recessed holes hole 144 arranged at different positions than the linear grooves 142, and a cam follower 146 that protrudes toward the inner radial side of the inner cylinder 140. The cam follower 146 passes through a linear groove 116 formed in the fixed cylinder 110 in a direction of the optical axis X. In this way, the inner cylinder 140 can move in the direction of the optical axis X without rotating relative to the fixed cylinder 110.

The tip of the cam follower 146 is inserted into the cam groove 175 of the cam cylinder 170. In this way, when the cam cylinder 170 is rotated, the drive force moving the inner cylinder 140 in the direction of the optical axis X passes from the cam groove 175 to the cam follower 146.

The middle cylinder 150 has a cam groove 152 oriented diagonally to the optical axis X, a cam follower 154 that protrudes radially outward, and a linear groove 156 that is oriented in the direction of the optical axis X. In the middle cylinder 150, the engaging protrusion 148 of the inner cylinder 140 is engaged with the engaging groove 158. In this way, the middle cylinder 150 can move integrally with the inner cylinder 140 relative to the fixed cylinder 110 in the direction of the optical axis X, and can rotate independently around the optical axis X.

The outer cylinder 161 has a cam follower 162 that protrudes radially inward. The cam follower 162 is engaged with the cam groove 152 of the middle cylinder 150 and the linear groove 142 of the inner cylinder 140. The front end of the outer cylinder 161 is joined to the lens frame 160 that holds the lens L1.

The zoom ring 130 is mounted in a manner to rotate around the fixed cylinder 110 when a rotation operation is performed from the outside. The zoom ring 130 has a linear guide groove 132 on an inner surface thereof that extends in a direction parallel to the optical axis X. The guide groove 132 engages with the cam follower 154 of the middle cylinder 150. Therefore, when the rotation operation is performed on the zoom ring 130, the middle cylinder 150 also rotates around the optical axis X.

The cam cylinder 170 is provided on an inner surface of the fixed cylinder 110 to be rotatable. The cam cylinder 170 has cam grooves 171, 173, and 175 that are each oriented diagonally to the optical axis X, and has a cam follower 172 that is fixed on a front end thereof via a connecting member 174.

The cam follower 172 is engaged with the linear groove 156 of the middle cylinder 150 through the recessed hole 144 of the inner cylinder 140. The cam groove 173 engages with the cam pin 115 fixed to protrude toward the inner surface of the fixed cylinder 110. The cam groove 175 engages with the cam follower 146 of the inner cylinder 140. The other cam groove 171 will be described further below.

The guide bars 192 and 194 are supported by support sections 112 and 114 provided on the inner surface of the fixed cylinder 110, and are arranged to be symmetric to each other across the optical axis X. Here, the support section 112 arranged on the upper side in FIG. 1 has a fitting hole 111 with a shape that complements the shape of the outer periphery of the guide bar 192, and the guide bar 192 is inserted through the fitting hole 111. In this way, the guide bar 192 is allowed to move in the direction of the optical axis X, while displacement in any other direction is prevented. Accordingly, the lens L2 and the lens frame 190 connected to the guide bar 192 can only move in the direction of the optical axis X.

The support section 114 arranged on the lower side in FIG. 1 has a U-shaped groove 113 with parallel surfaces separated by an interval equal to the diameter of the guide bar 194, and the guide bar 194 is inserted through the U-shaped groove 113. In this way, the guide bar 194 is allowed to move in the direction of the optical axis with the guide bar 192 as an axis, and displacement in a direction that intersects the plane of FIG. 1 is prevented. Accordingly, the lens frame 190 connected to the guide bar 192 is prevented from rotating with the guide bar 192 as an axis.

The front ends of the guide bars 192 and 194 are fixed to the lens frame 190 holding the lens L2, and are therefore formed integrally via the lens frame 190. Therefore, the guide bars 192 and 194 move linearly in the direction of the optical axis X integrally with the lens frame 190.

The focus ring 120 is provided rotatably on the outer surface of the fixed cylinder 110 to the rear of the zoom ring 130. A rotation amount detector 122 that detects the rotation amount of the focus ring 120 is provided below the focus ring 120. The rotation amount detector 122 detects the rotation amount of the focus ring 120 resulting from a rotation operation from the outside and generates a rotation amount signal, which is an electric signal corresponding to the rotation amount.

The rotation amount detector 122 described above may be formed using a rotary scale that rotates together with the focus ring 120 and an optical sensor that measures the rotary scale. As another example, the rotation amount detector 122 may be formed using a magnet that rotates with the focus ring 120 and a magnetic sensor that measures the change in the magnetic field caused by the movement of the magnet. The above formations are merely examples, and other configurations may be used instead.

The lens barrel 100 is further provided with a holding ring 180, a linear actuator 181, and a movement amount detector 183 on the inner side of the fixed cylinder 110. The holding ring 180 is arranged on the inner side of the cam cylinder 170, and the guide bars 192 and 194 are inserted therethrough.

Here, the holding ring 180 has a pair of fitting holes 186 through which the guide bar 192 is inserted. The fitting holes 186 have shapes that complement the outer peripheral surface of the guide bar 192. In this way, the holding ring 180 is allowed to move in the direction of the optical axis X, and displacement in any other direction is prevented.

The holding ring 180 has a cam follower 182 that engages with the cam groove 171 of the cam cylinder 170 formed on the outer peripheral surface thereof. In this way, when the cam cylinder 170 rotates on the optical axis X, the holding ring 180 moves linearly in the direction of the optical axis X. For this movement, it is desirable that the cam follower 182 be arranged on or near an extension of the line of the guide bar 192. Such an arrangement improves the drive efficiency for the cam follower 182.

The holding ring 180 has a pair of U-shaped grooves 188 through which the guide bar 194 is inserted. As a result, the holding ring 180 is prevented from rotating with the guide bar 192 as an axis. Accordingly, when the cam follower 182 is pressed by the cam cylinder 170, the lens frame 190 and the lens L2 can move smoothly along the optical axis.

The linear actuator 181 is supported by having the ends thereof sandwiched in the direction of the optical axis X by the holding ring 180 while the guide bar 192 is inserted therethrough. When operating in response to a received drive signal, the linear actuator 181 causes the guide bar 192 to move in the direction of the optical axis X. When not operating, the linear actuator 181 holds the guide bar 192 to prevent displacement in an axial direction. In other words, the inactive linear actuator 181 moves integrally with the guide bar 192 when the guide bar 192 moves.

One example of a linear actuator 181 that has enough holding strength and drive force for the guide bar 192 is an actuator that uses electromagnetic transduction elements such as piezoelectric materials, electrostrictive materials, and the like. When the drive force is generated by a device that does not have a self-holding function, such as a magnetic actuator, the linear actuator 181 may be provided with a separate mechanism for holding the guide bar 192 when operation is not being performed.

When the linear actuator 181 moves the guide bar 192 linearly, the movement amount detector 183 measures the movement amount of the guide bar 192 and generates an electric signal corresponding to this movement amount. In this way, for example, the movement amount of the linear actuator 181 can be controlled with consideration to the movement amount of the guide bar 192, so that the lens L2 held by the lens frame 190 supported on the tip of the guide bar 192 can be accurately moved according to the movement amount that is necessary for focusing.

The movement amount detector 183 may be formed by a linear scale that moves integrally with the guide bar 192 and an optical sensor that measures the scale. As another example, the movement amount detector 183 may be formed by a magnet that moves with the guide bar 192 and a magnetic sensor that measures the change in the magnetic field caused by the movement of the magnet. The above formations are merely examples, and other configurations may be used instead.

The lens barrel 100 is further provided with a barrel control section 185 that receives a rotation amount signal and a movement amount signal from the rotation amount detector 122 and the movement amount detector 183 to control the operation of the linear actuator 181. Upon receiving the rotation amount signal, the barrel control section 185 supplies the linear actuator 181 with a drive signal corresponding to the received rotation amount signal. Upon receiving the movement amount signal, the barrel control section 185 performs feedback control for the drive amount of the linear actuator 181.

In the lens barrel 100 having the above configuration, when the linear actuator 181 stops so that the cam cylinder 170 rotates while holding the guide bar 192, the engagement between the cam groove 171 and the cam follower 182 causes the holding ring 180, the guide bar 192, and the lens frame 190 to move integrally. As a result, the lens L2 moves in the direction of the optical axis X.

When the linear actuator 181 operates while the cam cylinder 170 is in a fixed state, the guide bar 192 and the lens frame 190 move integrally, and so the lens L2 moves in the direction of the optical axis X. In this way, the lens barrel 100 has two mechanisms for moving the lens L2. Accordingly, the lens L2 can be moved with one of the mechanisms allocated to scaling and the other mechanism allocated to focusing.

The other lenses L1, L3, L4, and L5 need to move only when the lens barrel 100 scales, and so a conventional movement mechanism can be used. In other words, the lens frames 70, 80, and 90 can move while being guided along a cam groove and a linear groove formed in the cam cylinder 170 and the fixed cylinder 110. Another configuration may involve using the guide bars 192 and 194 to guide the lens frames 70, 80, and 90.

Figure 2:
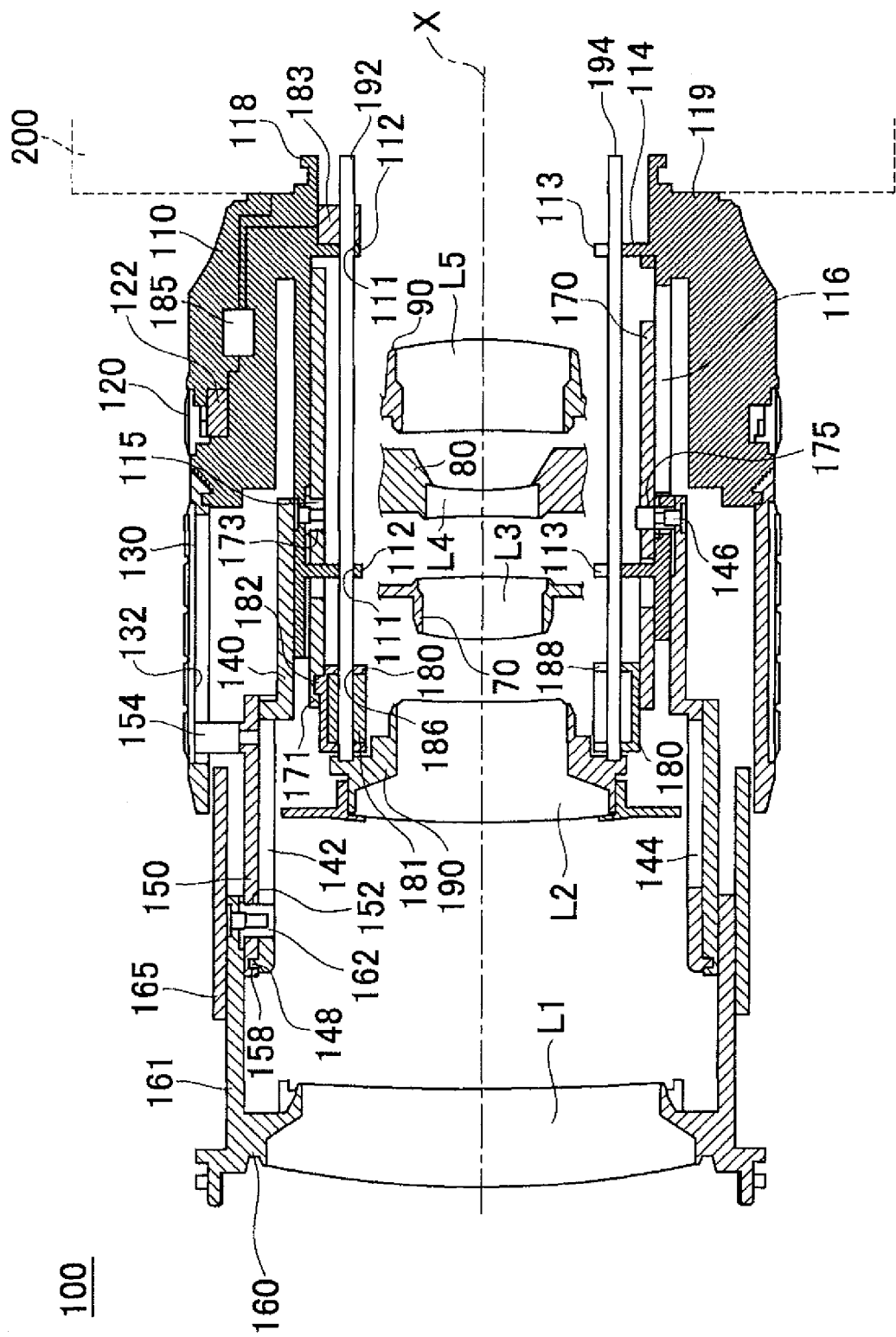
FIG. 2 is a cross-sectional view of the lens barrel 100 scaled as a telephoto lens.

FIG. 2 is a cross-sectional view of the lens barrel 100, and shows a state in which the lens barrel 100 has zoomed to act as a telephoto lens. The following is a description of the operation of the lens barrel 100, in which components that are the same as those in FIG. 1 are given the same reference numerals, and further description is omitted.

In the lens barrel 100, when a rotation operation is performed to rotate the zoom ring 130 around the optical axis X, the middle cylinder 150 rotates according to the rotational drive force that is transmitted thereto through the cam follower 154 engaged with the guide groove 132. When the middle cylinder 150 is rotated, the outer cylinder 161 moves along the linear groove 142 in the direction of the optical axis X due to the drive force transmitted from the cam groove 152 to the cam follower 162. In this way, the lens frame 160 joined to the tip of the outer cylinder 161 moves integrally with the lens L1 held therein.

Also, when the middle cylinder 150 is rotated, the rotational drive is transmitted to the cam cylinder 170 via the cam follower 172 engaged with the linear groove 156. As a result, the cam cylinder 170 rotates around the optical axis X.

When the cam cylinder 170 rotates, the holding ring 180 is driven via the cam follower 182 engaged with the cam groove 171. As a result, the holding ring 180 is guided by the guide bars 192 and 194 to move in the direction of the optical axis X. At this time, the guide bar 192 is held without needing the linear actuator 181 to operate. Accordingly, the guide bar 192, the lens frame 190, and the lens L2 move integrally with the holding ring 180 in the direction of the optical axis X.

Since the cam pin 115 engaged with the cam groove 173 is fixed to the fixed cylinder 110, when the cam cylinder 170 rotates, the cam cylinder 170 itself also moves along the inner surface of the fixed cylinder 110 in the direction of the optical axis X. Furthermore, when the cam cylinder 170 rotates, the inner cylinder 140 is driven via the cam follower 146 engaged with the cam groove 175 to move in the direction of the optical axis X.

As a result of this series of operations, the lens barrel 100 expands or contracts, such that the interval between the lens L1 and the lens L2 increases or decreases. Accordingly, the focal distance of the entire lens barrel 100 changes. The zoom operation of the lens barrel 100 also moves the other lenses L3, L4, and L5 to change the intervals therebetween.

A cover cylinder 165 that is mounted on the same axis as the fixed cylinder 110 is provided between the outer cylinder 161 and the zoom ring 130. The cover cylinder 165 moves forward and backward together with the outer cylinder 161, and seals the space between the outer cylinder 161 and the zoom ring 130. As a result, dust is prevented from entering into the lens barrel 100.

In this way, when the rotation operation is performed on the zoom ring 130, the entire lens barrel 100 extends or contracts to change the intervals between the lenses L1, L2, L3, L4, and L5. When the rotation operation is performed on the focus ring 120, the rotation amount detector 122 transmits a rotation amount signal corresponding to the rotation amount of the focus ring 120 to the barrel control section 185. The barrel control section 185 supplies the linear actuator 181 with a drive signal corresponding to the received rotation amount signal. As a result, the linear actuator 181 operates according to the rotation amount of the focus ring 120.

When the linear actuator 181 operates, the guide bar 192 moves in the direction of the optical axis X. The movement amount detector 183 measures the linear movement of the guide bar 192 and supplies the barrel control section 185 with a movement amount signal corresponding to this measurement result. Upon receiving the movement amount signal, the barrel control section 185 corrects the drive signal while referencing the movement amount signal. In this way, the lens L2 can be driven with an accurate movement amount.

Figure 3:
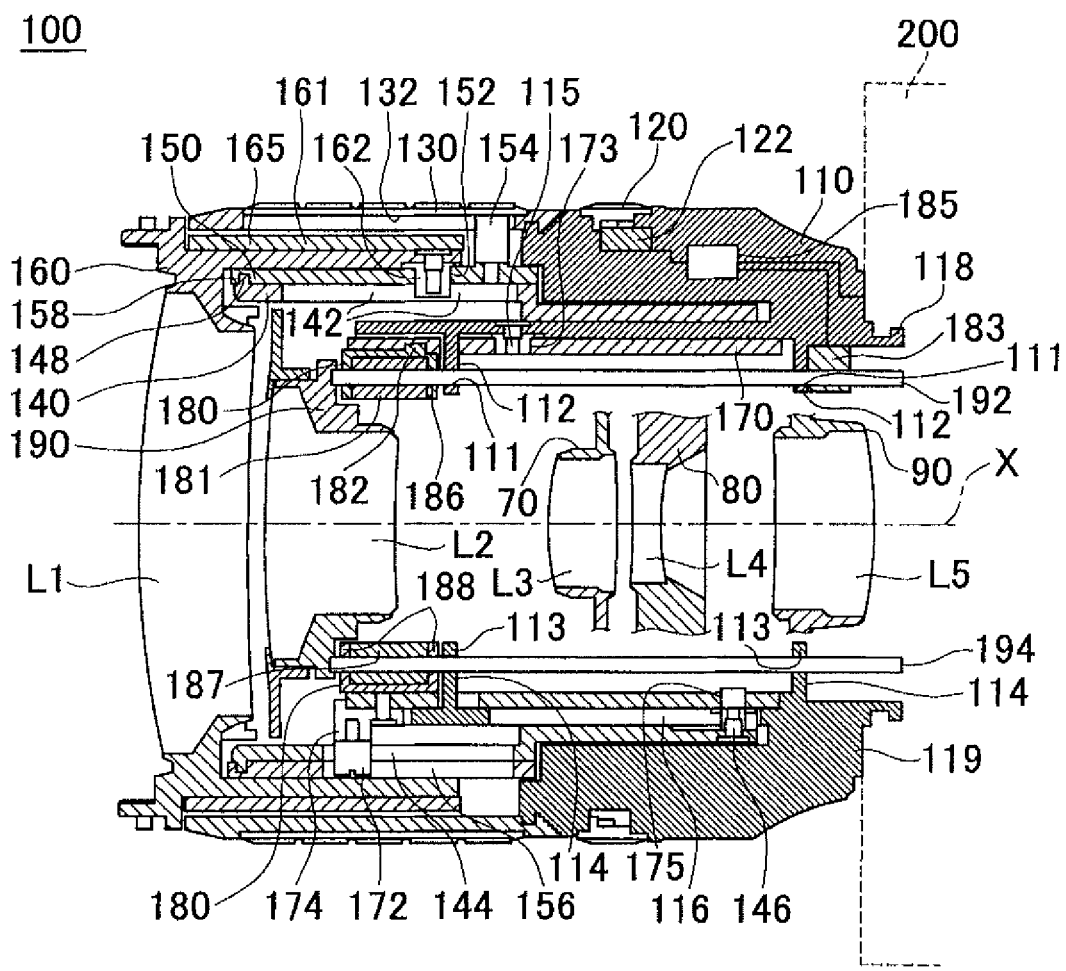
FIG. 3 is a cross-sectional view of another configuration of the lens barrel 100.

FIG. 3 is a cross-sectional view of another configuration of the lens barrel 100. Aside from the portions described below, this lens barrel 100 has the same configuration as the lens barrel 100 described in relation to FIGS. 1 and 2. Components that are the same as those shown in FIGS. 1 and 2 are given the same reference numerals, and redundant explanation is omitted.

In addition to the linear actuator 181 through which the guide bar 192 is inserted, this lens barrel 100 further includes a linear actuator 187 through which the guide bar 194 is inserted. This additional linear actuator 187 is held by the holding ring 180 and holds the guide bar 194 when not operating. Therefore, when the holding ring 180 moves, the guide bar 194 also moves integrally with the holding ring 180.

When the linear actuators 181 and 187 operate simultaneously, the guide bars 192 and 194 are both driven. As a result, the lens frame 190 holding the lens L2 is driven simultaneously at both top and bottom ends in FIG. 3 to move smoothly.

The above example describes a case in which the pair of linear actuators 181 and 187 operate and stop simultaneously. However, by operating each linear actuator 181 and 187 independently, the inclination of the lens frame 190 and the lens L2 relative to the optical axis X can be changed. Therefore, characteristics of an optical system caused by inclination of the lens L2 can be compensated for using these linear actuators 181 and 187.

Figure 4:
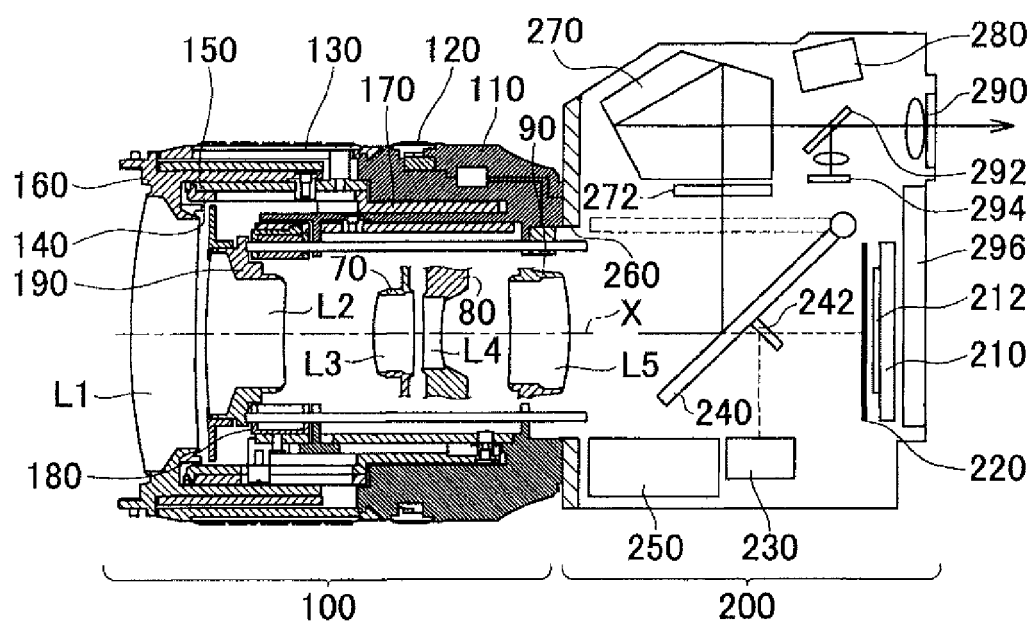
FIG. 4 is a schematic view of an image capturing apparatus 300.

FIG. 4 is a schematic view of an image capturing apparatus 300 provided with the lens barrel 100. In order to prevent FIG. 4 from being overly complex, the lens barrel 100 is shown schematically. However, the lens barrel 100 shown in FIG. 4 has the same configuration as any one of the lens barrels 100 described in FIGS. 1 to 3. Therefore, components that are the same as those in FIGS. 1 to 3 are given the same reference numerals and redundant explanation is omitted.

The image capturing apparatus 300 includes the lens barrel 100 and an image capturing unit 200. The lens barrel 100 is detachably mounted on a mount section 260 of the image capturing unit 200.

The lens barrel 100 mounted in the image capturing apparatus 300 is electrically connected to the image capturing unit 200 via connection terminals, not shown. In this way, the lens barrel 100 receives power from the image capturing unit 200. Furthermore, signals are transmitted from the lens barrel 100 to the image capturing unit 200.

The image capturing unit 200 houses a main control section 250 and an optical system that includes a main mirror 240, a pentaprism 270, and an ocular optical system 290. The main mirror 240 moves between a standby position, in which the main mirror 240 is oriented diagonally in the optical path of incident light through the optical system of the lens barrel 100, and an image capture position, which is shown by the dotted line in FIG. 4 and in which the main mirror 240 is raised out of the optical path of the incident light.

When in the standby position, the main mirror 240 guides a majority of the incident light to a focusing screen 272 arranged thereabove. The focusing screen 272 is arranged at a position to form an image when the optical system of the lens barrel 100 is focused, and causes this image to be visible.

The image formed by the focusing screen 272 can be seen from the ocular optical system 290 via the pentaprism 270. Therefore, the image on the focusing screen 272 can be seen as a normal image from the ocular optical system 290.

A half mirror 292 is arranged between the pentaprism 270 and the ocular optical system 290. The half mirror 292 superimposes the display image formed by the finder LCD 294 onto the image of the focusing screen 272. As a result, the image seen at the output end of the ocular optical system 290 is a combination of the image of the focusing screen 272 and the image of the finder LCD 294. The finder LCD 294 displays information concerning image capturing conditions, setting conditions, and the like of the image capturing apparatus 300.

A portion of the light output from the pentaprism 270 is guided to the photometric unit 280. The photometric unit 280 measures the intensity of the light and a distribution or the like thereof, and these measurement results are referenced when determining the image capturing conditions.

The back surface of the main mirror 240, which is opposite the incident surface that receives the incident light, has a secondary mirror 242. The secondary mirror 242 guides a portion of the incident light passing through the main mirror 240 to a focal point detection apparatus 230 positioned therebelow. Therefore, when the main mirror 240 is in the standby position, the focal point detection apparatus 230 detects a focal adjustment state of the optical system. When the main mirror 240 moves to the image capture position, the secondary mirror 242 also moves out of the optical path of the incident light.

A shutter 220, an optical filter 212, and an image capturing element 210 are arranged on the optical axis behind the main mirror 240 relative to a direction of the incident light from the lens barrel 100. When the shutter 220 is open, the main mirror 240 moves to the image capture position immediately therebefore, and so the incident light progresses to be incident to the image capturing element 210. As a result, the image formed by the incident light is converted into an electric signal by the image capturing element 210.

The image capturing unit 200 is provided with a main LCD 296 facing outward on a back surface of the lens barrel 100. The main LCD 296 displays various types of setting information concerning the image capturing unit 200, and also displays the image formed by the image capturing element 210 when the main mirror 240 is in the image capture position.

The main control section 250 performs overall control of the various operations described above. Furthermore, an auto-focus mechanism can be formed that drives the lens barrel 100 while referencing information concerning the distance to a subject as detected by the focal point detection apparatus 230 of the image capturing unit 200. As another example, an auto-focus mechanism can be formed by the focal point detection apparatus 230 referencing the movement amount of the lens barrel 100.

The main control section 250 also controls the opening and closing of a diaphragm apparatus 222 by exchanging information with a microprocessor of the lens barrel 100. The main control section 250 also provides automatic exposure, scene mode execution, bracket image capturing, or the like.

Figure 5:
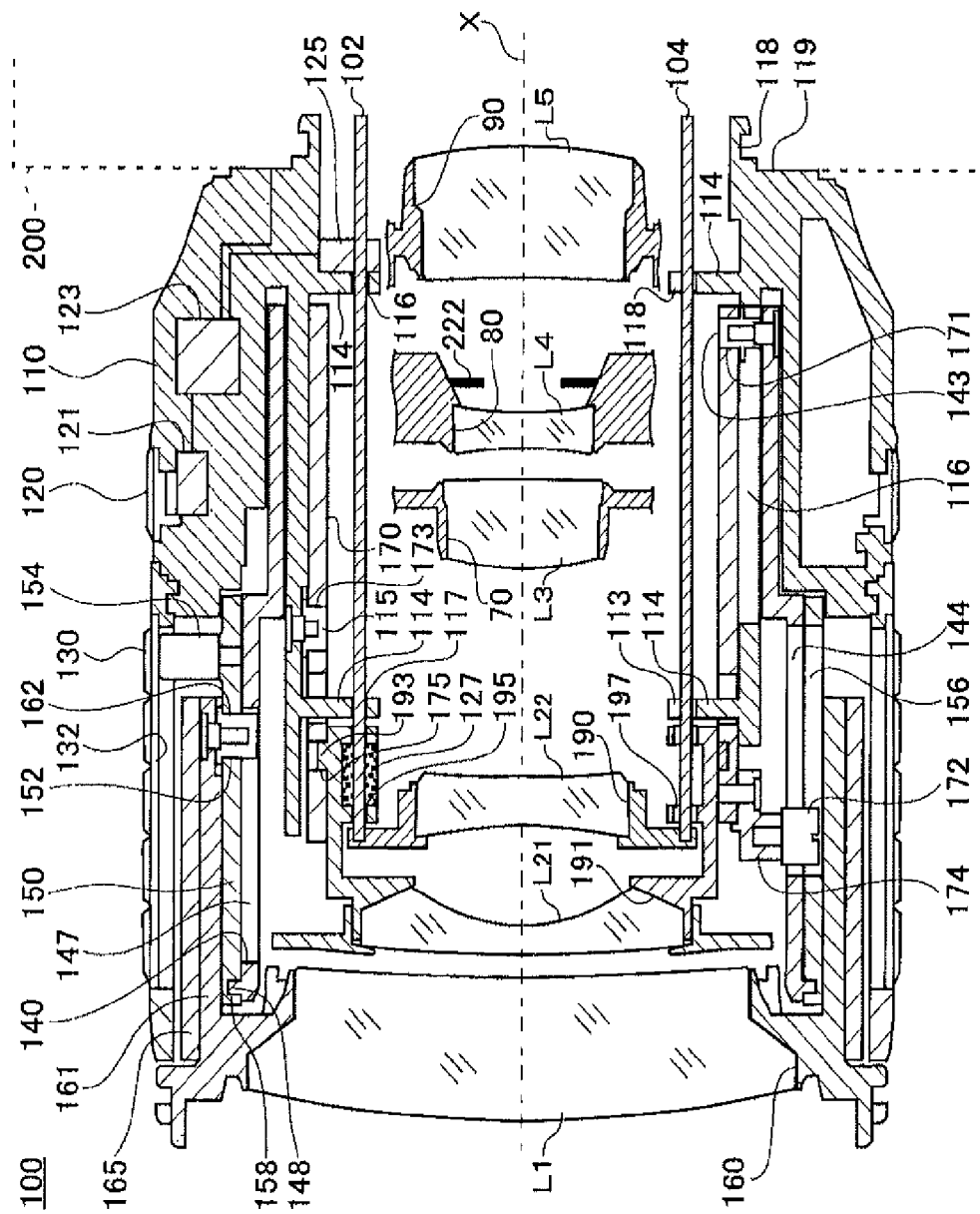
FIG. 5 is a cross-sectional view of the lens barrel 100.
Figure 6:
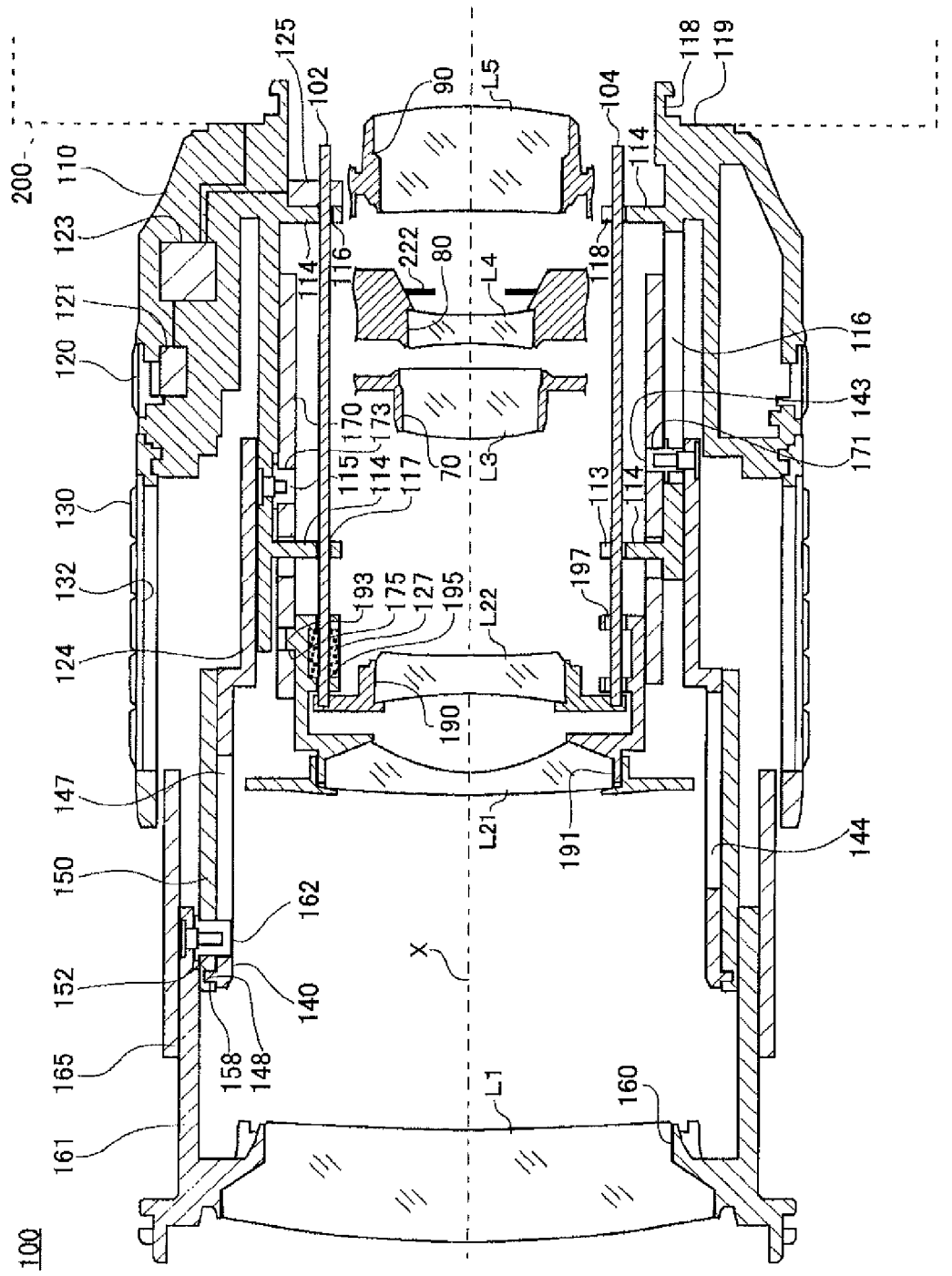
FIG. 6 is a cross-sectional view of the lens barrel 100.

FIGS. 5 and 6 are cross-sectional views of the lens barrel 100. FIG. 5 shows a state in which the lens barrel 100 is scaled as a wide angle lens, and FIG. 6 shows a state in which the lens barrel 100 is scaled as a telephoto lens. Components that are common to FIGS. 5 and 6 are given the same reference numerals. Due to the scaling operation of the lens barrel 100, some of the components shown in FIG. 5 are not displayed in FIG. 6.

The lens barrel 100 is provided with an optical system that includes six lenses L1, L21, L22, L3, L4, and L5 arranged in order on a common optical axis X. In the following description, unless specifically stated otherwise, the physical side of the optical system of the lens barrel 100 is the front side, and the image side is the rear side.

The lenses L1, L21, L22, L3, L4, and L5 are respectively held by lens frames 160, 191, 190, 70, 80, and 90. The lens frame 80 holding the lens L4 also holds a diaphragm apparatus 222 that changes the optical path diameter of the optical system.

The lens frame 191 has a cam follower 193, and holds a linear actuator 127. The cam follower 193 protrudes radially outward from an outer peripheral surface of the lens frame 190.

The lens barrel 100 has the fixed cylinder 110 fixed to the image capturing unit 200 including an image sensor or the like. Here, the fixed cylinder 110 serves as a stable reference for the movement of the lens barrel 100.

The inner cylinder 140, the middle cylinder 150, the outer cylinder 161, and the zoom ring 130 are arranged in the stated order, beginning with the innermost, in the outer periphery of the front end of the fixed cylinder 110. The focus ring 120 is arranged on the outer peripheral surface of the lens barrel 100 behind the zoom ring 130.

The cam cylinder 170 is arranged on the inner side of the fixed cylinder 110. The cam cylinder 170 has cam grooves 171, 173, and 175 that are each formed diagonally to the optical axis X.

A pair of guide bars 102 and 104 are arranged parallel to the optical axis X on the inner side of the cam cylinder 170. The front ends of the guide bars 102 and 104 are fixed to the lens frame 190 to be formed integrally with the lens frame 190.

The fixed cylinder 110 has the linear groove 116, the cam pin 115, the mount 118, and the support section 114. The linear groove 116 extends in the direction of the optical axis X of the lens barrel 100. The cam pin 115 protrudes radially inward from the inner peripheral surface of the fixed cylinder 110, and engages with the cam groove 173 of the cam cylinder 170.

The mount 118 is provided on the rear end of the fixed cylinder 110. By engaging the mount 118 with the image capturing unit 200, the fixed cylinder 110 is fixed to the image capturing unit 200. When the fixed cylinder 110 is fixed to the image capturing unit 200, the mount surface 119 at the rear end of the fixed cylinder 110 closely contacts the front surface of the image capturing unit 200. In this way, the position of the entire lens barrel 100 can be fixed relative to the image capturing unit 200.

Two pairs of support sections 114 are formed protruding radially inward from the inner peripheral surface of the fixed cylinder 110 to support the guide bars 102 and 104. The pair of support sections 114 arranged on the upper side in FIG. 5 to support the guide bar 102 each have a fitting hole 117 with a shape that complements the shape of the outer periphery of the guide bar 102. The guide bar 102 is inserted through the fitting holes 117 to be supported in a slideable manner. In this way, the guide bar 102 is allowed to move in the direction of the optical axis X, while displacement in any other direction and inclination are prevented.

The support sections 114 arranged on the lower side in FIG. 5 to support the guide bar 104 each have a U-shaped groove 113 with parallel surfaces separated by an interval equal to the diameter of the guide bar 104. The guide bar 104 is inserted through the U-shaped groove 113, so that the guide bar 104 is allowed to move in the direction of the optical axis X and displacement in a direction orthogonal to the optical axis X is prevented.

The pair of guide bars 102 and 104 is connected to the lens frame 190, thereby preventing inclination of the lens L21. The guide bar 104 works together with the guide bar 102 to guide the lens frame 190 in the direction of the optical axis X.

The guide bars 102 and 104 also guide the lens frame 191. In other words, the lens frame 191 has a fitting hole 195 with a shape that complements the shape of the outer periphery of the guide bar 102, and the guide bar 102 is inserted through this fitting hole 195. In this way, the lens frame 190 is prevented from being inclined relative to the optical axis X.

The lens frame 191 has an elongated hole 197 with parallel surfaces separated by an interval equal to the diameter of the guide bar 104, and the guide bar 104 is inserted through this elongated hole 197. This elongated hole 197 and the fitting hole 195 described above prevent the lens frame 190 and the lens L21 held therein from rotating around the optical axis X.

The guide bar 102 is inserted through a linear actuator 127, and the guide bar 102 moves in the direction of the optical axis X when the linear actuator 127 operates. The linear actuator 127 is held by the lens frame 191, and so the guide bar 102 moves relative to the lens frame 191 when the linear actuator 127 operates. With this configuration of the linear actuator 127 linearly driving the guide bar 102, the drive mechanism for the guide bar 102 can be formed without increasing the number of components.

Furthermore, when not operating, the linear actuator 127 holds the guide bar 102 and prevents displacement of the guide bar 102 relative to the linear actuator 127. Accordingly, the guide bar 102 is formed integrally with the lens frame 191 when the linear actuator 127 is not operating.

The linear actuator 127, which can switch between the operation to drive the guide bar 102 and the operation to hold the guide bar 102, can be used to form an ultrasonic actuator using piezoelectric materials, electrostrictive materials, and the like. Furthermore, the linear actuator 127 can be formed to be equivalent to both an actuator that drives the guide bar 102 and a mechanism that holds the guide bar 102.

The inner cylinder 140 has a cam follower 143, a recessed hole 144, a linear groove 147, and an engaging protrusion 148. The cam follower 143 is positioned near a rear end of the inner cylinder 140 and protrudes radially inward to the lens barrel 100. The linear groove 147 extends in the direction of the optical axis X. The engaging protrusion 148 protrudes outward in a radial direction of the lens barrel 100.

The cam follower 143 passes through the linear groove 116 of the fixed cylinder 110 to engage with the cam groove 171 of the cam cylinder 170. As a result, the cam follower 143 is prevented from rotating around the optical axis X. Since the cam groove 171 is formed diagonal to the optical axis X, when the cam cylinder 170 rotates, the drive force that moves the inner cylinder 140 in the direction of the optical axis X is transmitted to the cam follower 143.

The recessed hole 144 is arranged on the substantially opposite side from the linear groove 147 in a circumferential direction of the lens barrel 100. The cam follower 172 of the cam cylinder 170, which is described further below, is inserted through the recessed hole 144.

The middle cylinder 150 has a cam follower 154, a cam groove 152, a linear groove 156, and an engaging groove 158. The cam follower 154 protrudes outward in a radial direction of the lens barrel 100. The cam groove 152 extends diagonally to the optical axis X.

The linear groove 156 is arranged on the substantially opposite side from the cam groove 152 in a circumferential direction of the lens barrel 100. The linear groove 156 extends in the direction of the optical axis X and engages with the cam follower 172 of the cam cylinder 170.

The engaging groove 158 is fixated in the inner peripheral surface of the middle cylinder 150 along a plane orthogonal to the optical axis X. The engaging groove 158 engages with the engaging protrusion 148 of the inner cylinder 140. In this way, the middle cylinder 150 moves integrally with the inner cylinder 140 in the direction of the optical axis X, and is rotatable around the optical axis X relative to the inner cylinder 140.

The outer cylinder 161 has a cam follower 162. The cam follower 162 protrudes inward in a radial direction of the lens barrel 100, and engages with the cam groove 152 of the middle cylinder 150 and the linear groove 147 of the inner cylinder 140. As a result, when the middle cylinder 150 rotates around the optical axis X, the cam follower 162 prevents the outer cylinder 161 from rotating around the optical axis X and transmits the drive force in the direction of the optical axis X to the outer cylinder 161.

The outer cylinder 161 is connected to the lens frame 160 that holds the lens L1. Therefore, when the outer cylinder 161 moves in the direction of the optical axis X, the lens L1 also moves along the optical axis X.

The cam cylinder 170 is arranged on the inner side of the fixed cylinder 110 in a manner to be rotatable. The cam cylinder 170 has a plurality of cam grooves 171, 173, and 175 and a cam follower 172. Each cam groove 171, 173, and 175 is formed to be diagonal to the optical axis X. The cam groove 171 engages with the cam follower 143 of the inner cylinder 140. The cam groove 173 engages with the cam pin 115 of the fixed cylinder 110. The cam groove 175 engages with the cam follower 193 of the lens frame 191.

The cam follower 193 is desirably arranged near the guide bar 102 in the circumferential direction of the lens frame 191. This arrangement improves the transfer efficiency of the drive force by the cam follower 193.

The cam follower 172 is mounted on the cam cylinder 170 via the connecting member 174. The tip of the cam follower 172 passes through the recessed hole 144 of the inner cylinder 140 to engage with the linear groove 156 of the middle cylinder 150. Therefore, when the middle cylinder 150 rotates around the optical axis X, the drive force rotating the cam cylinder 170 is transmitted from the cam follower 172 to the cam cylinder 170.

In order to generate drive force for moving the lens frames 70, 80, and 90 holding the other lenses L3, L4, and L5 in the direction of the optical axis X, the cam cylinder 170 may be further provided with other cam grooves or the like, not shown. In order to decrease the weight, for example, portions of the cam cylinder 170 in which cam grooves are not formed can be removed. Therefore, the cam cylinder 170 is not necessarily a complete cylinder.

The zoom ring 130 is attached to be rotatable around the optical axis X along the outer peripheral surface of the fixed cylinder 110. The zoom ring 130 has a guide groove 132 formed on the inner peripheral wall thereof. The guide groove 132 extends in a line parallel to the optical axis X and engages with the cam follower 154 of the middle cylinder 150. As a result, when the rotation operation is performed on the zoom ring 130, the middle cylinder 150 also rotates around the optical axis X.

The focus ring 120 is attached to be rotatable around the optical axis X along the outer peripheral surface of the fixed cylinder 110. The focus ring 120 has a rotation amount detector 121 provided on the inner side therefore. The focus ring 120 further includes a barrel control section 123 connected to the rotation amount detector 121. The barrel control section 123 is also connected to the movement amount detector 125 arranged near the rear end of the fixed cylinder 110.

The rotation amount detector 121 detects the rotation amount of the focus ring 120, which is rotated by the rotation operation from the outside. The movement amount detector 125 detects the movement amount in the direction of the optical axis X of the guide bar 102 relative to the fixed cylinder 110. The operation of the barrel control section 123 is described further below.

The rotation amount detector 121 may be fanned using a rotary scale that rotates together with the focus ring 120 and an optical sensor that measures the rotary scale. As another example, the rotation amount detector 121 may be formed using a magnet that rotates with the focus ring 120 and a magnetic sensor that measures the change in the magnetic field caused by the movement of the magnet.

The movement amount detector 125 may be formed by a linear scale that moves integrally with the guide bar 102 and an optical sensor that measures the linear scale. As another example, the movement amount detector 125 may be formed using a magnet that moves with the guide bar 102 and a magnetic sensor that measures the change in the magnetic field caused by the movement of the magnet.

The following describes the scaling operation of the lens barrel 100 having the configuration described above. In the scaling operation of the lens barrel 100, the zoom ring 130 undergoes the rotation operation to move all of the lenses L1, L21, L22, L3, L4, and L5 in the direction of the optical axis L. It should be noted that lenses L21 and L22 move integrally, as described further below.

When the zoom ring 130 is operated from the outside to rotate around the optical axis X, the cam follower 154 of the middle cylinder 150 engages with the guide groove 132 of the zoom ring 130, and so the rotational drive force is transmitted to the middle cylinder 150. In FIG. 6, the cam follower 154 moved by this rotation cannot be seen.

When the middle cylinder 150 rotates, the drive force is transmitted from the cam groove 152 to the cam follower 162 of the outer cylinder 161. Upon receiving the drive force, the cam follower 162 is guided by the linear groove 147 of the inner cylinder 140 to move in the direction of the optical axis X. In this way, the lens frame 160 joined to the tip of the outer cylinder 161 can move integrally in the direction of the optical axis X with the lens L1 held therein.

Also, when the middle cylinder 150 rotates, rotational drive force is transmitted to the cam follower 172 engaged with the linear groove 156. Therefore, the cam cylinder 170 rotates around the optical axis X along the inner peripheral surface of the fixed cylinder 110. In FIG. 6, the linear groove 156 and the cam follower 172 moved by this rotation cannot be seen.

When the cam cylinder 170 rotates, the drive force is transmitted to the cam follower 143 engaged with the cam groove 171. The cam follower 143 is guided by the linear groove 116 of the fixed cylinder 110 to move in the direction of the optical axis X. As a result, the inner cylinder 140 and the middle cylinder 150, which is engaged to the inner cylinder 140 via the engaging groove 158, move in the direction of the optical axis X.

Also, when the cam cylinder 170 rotates, the cam cylinder 170 is driven by the cam pin 115 of the fixed cylinder 110 engaged with the cam groove 173 to move in the direction of the optical axis X. Also, when the cam cylinder 170 rotates, the drive force is transmitted from the cam groove 175 to the cam follower 193 so that the lens L21 moves together with the lens frame 191 in the direction of the optical axis X.

When not operating, the linear actuator 127 holds the guide bar 102. Therefore, the guide bars 102 and 104 move together with the lens frame 191. Accordingly, the lens frame 190 joined with the guide bars 102 and 104 also moves together with the lens L22.

In this way, when the rotation operation is performed in the zoom ring 130, the lenses L21 and L22 move integrally. Furthermore, the lens L1 moves in response to the movement of the outer cylinder 161. Since the other lenses L3, L4, and L5 also move such that the intervals therebetween change, the focal distance of the lens barrel 100 can be changed.

The other lenses L3, L4, and L5 only need to move when the lens barrel 100 is scaling, and so a known drive mechanism can be used. In other words, the lens frames 70, 80, and 90 may move while being guided by cam grooves and linear grooves formed in the cam cylinder 170 and the fixed cylinder. As another example, the guide bars 102 and 104 may be used to guide the lens frames 70, 80, and 90.

A cover cylinder 165 disposed coaxially to the fixed cylinder 110 is provided between the outer cylinder 161 and the zoom ring 130. The cover cylinder 165 moves forward and backward together with the outer cylinder 161, and seals the space between the outer cylinder 161 and the zoom ring 130. As a result, dust is prevented from entering into the lens barrel 100.

In the above example, the cam cylinder 170 and the lens frame 191 are engaged with the cam groove 175 on the cam cylinder 170 side via the cam follower 193 on the lens frame 190 side. However, the same effect can be achieved when the cam follower is provided on the cam cylinder 170 side and the cam groove is provided on the lens frame 191 side.

Figure 7:
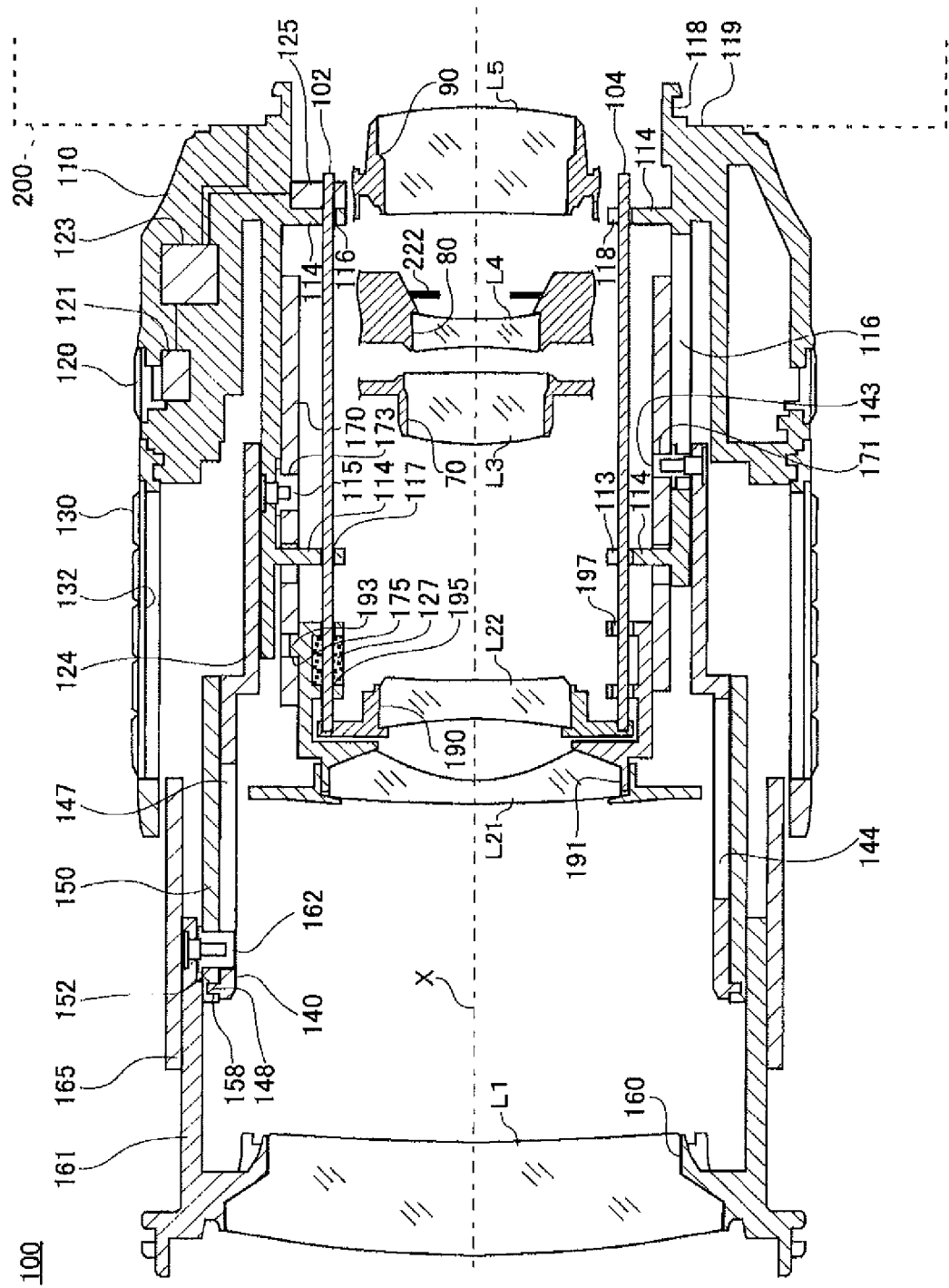
FIG. 7 is a cross-sectional view of the lens barrel 100.

FIG. 7 is a cross-sectional diagram describing the focusing of the lens barrel 100. Components that are the same as those shown in FIGS. 5 and 6 are given the same reference numerals, and redundant explanation is omitted. When focusing, the lens L22 moves but the lens L21 does not. The other lenses L1, L3, L4, and L5 do not move.

When the focus ring 120 in the lens barrel 100 undergoes the rotation operation, the rotation amount detector 121 transmits a rotation amount signal corresponding to the rotation amount to the barrel control section 123. The barrel control section 123 generates a drive signal that increases or decreases according to the rotation amount signal received from the rotation amount detector 121, and supplies this drive signal to the linear actuator 127.

The linear actuator 127 operates according to the drive amount corresponding to the received drive signal to move the guide bar 102 in the direction of the optical axis X. As a result, the lens frame 190 moves together with the guide bar 102 to change the focal position of the lens barrel 100. At this time, the movement of the lens frame 190 causes the guide bar 104 to move in the direction of the optical axis X.

The movement amount detector 125 transmits a movement amount signal corresponding to the movement amount of the guide bar 102 to the barrel control section 123. The barrel control section 123 corrects the generated drive signal by referencing the movement amount signal received from the movement amount detector 125. In this way, an error in the movement amount of the guide bar 102 caused by disturbance is corrected so that the lens L22 can move accurately, and the lens barrel 100 can therefore focus quickly and accurately.

Figure 8:
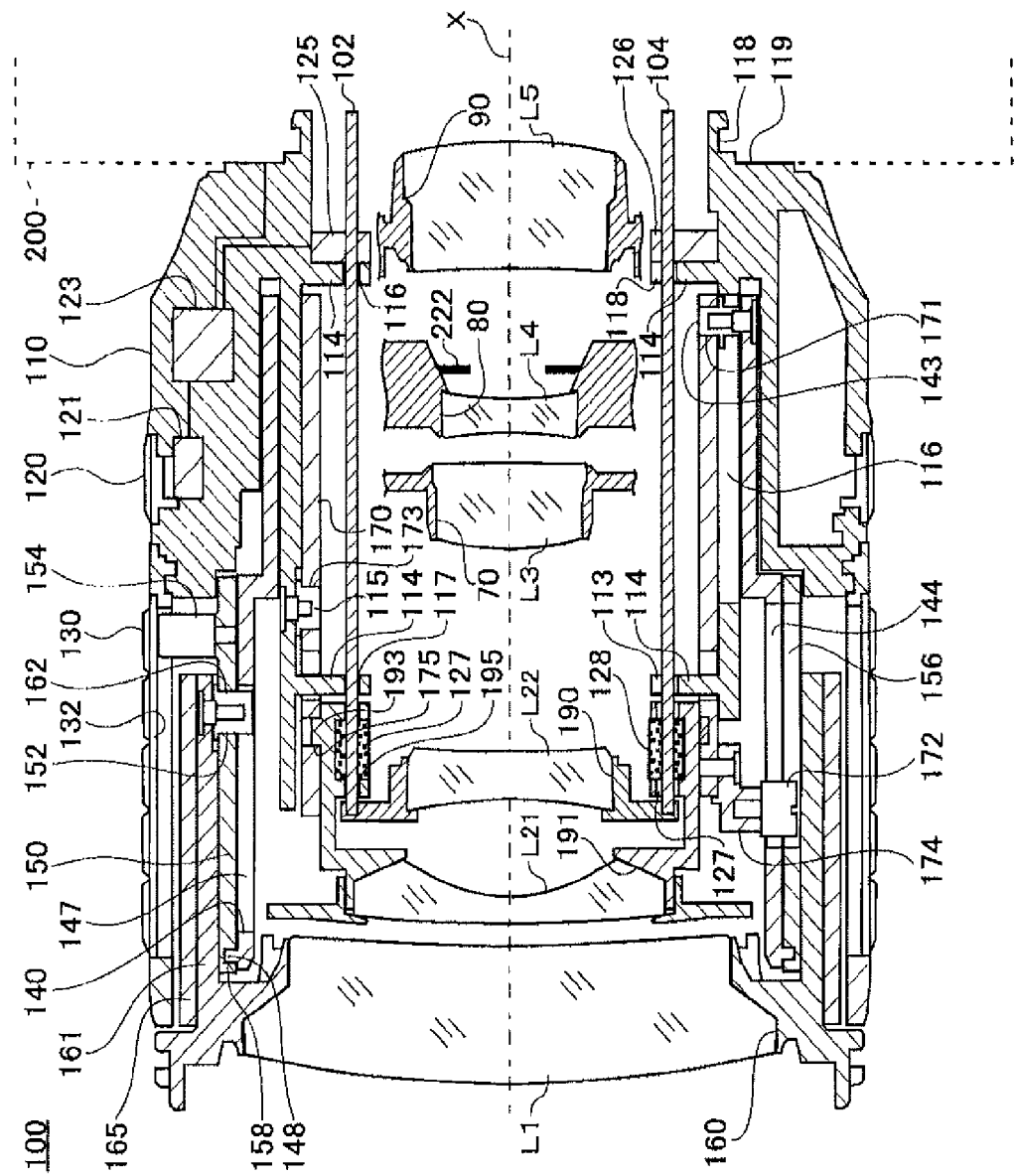
FIG. 8 is a cross-sectional view of the lens barrel 100.

FIG. 8 is a cross-sectional view of another configuration of the lens barrel 100. Aside from the differences described below, this lens barrel 100 has the same configuration as the lens barrel 100 described in FIGS. 5 to 7. Therefore, components that are the same as those shown in FIGS. 5 to 7 are given the same reference numerals, and redundant explanation is omitted.

In addition to the linear actuator 127 through which the guide bar 102 is inserted, this lens barrel 100 further includes a linear actuator 128 through which the guide bar 104 is inserted and a movement amount detector 126. This additional linear actuator 128 operates in parallel with the known linear actuator 127. In other words, the linear actuator 128 controls the barrel control section 123 simultaneously with the linear actuator 127, and so the linear actuator 128 operates or stops at the same time that the linear actuator 127 operates or stops.

When the linear actuators 127 and 128 are not operating, these linear actuators hold the guide bars 102 and 104 to prevent displacement relative to the linear actuators 127 and 128. Therefore, when the lens frame 191 moves as a result of the scaling, the lens frame 190 also moves integrally with the lens frame 191. At this time, the guide bars 102 and 104 drive the top end and the bottom end of the lens frame 190 simultaneously, so that the lens L22 can move smoothly.

The linear actuators 127 and 128 operate simultaneously to drive the guide bars 102 and 104. As a result, the lens frame 190 holding the lens L22 is driven simultaneously at both top and bottom ends in FIG. 8 to move smoothly.

The above example describes a case in which the pair of linear actuators 127 and 128 operate and stop simultaneously. However, by operating each linear actuator 127 and 128 independently, the inclination of the lens frame 190 and the lens L22 relative to the optical axis X can be changed. Therefore, characteristics of an optical system caused by inclination of the lens L22 can be compensated for using these linear actuators 127 and 128.

Figure 9:
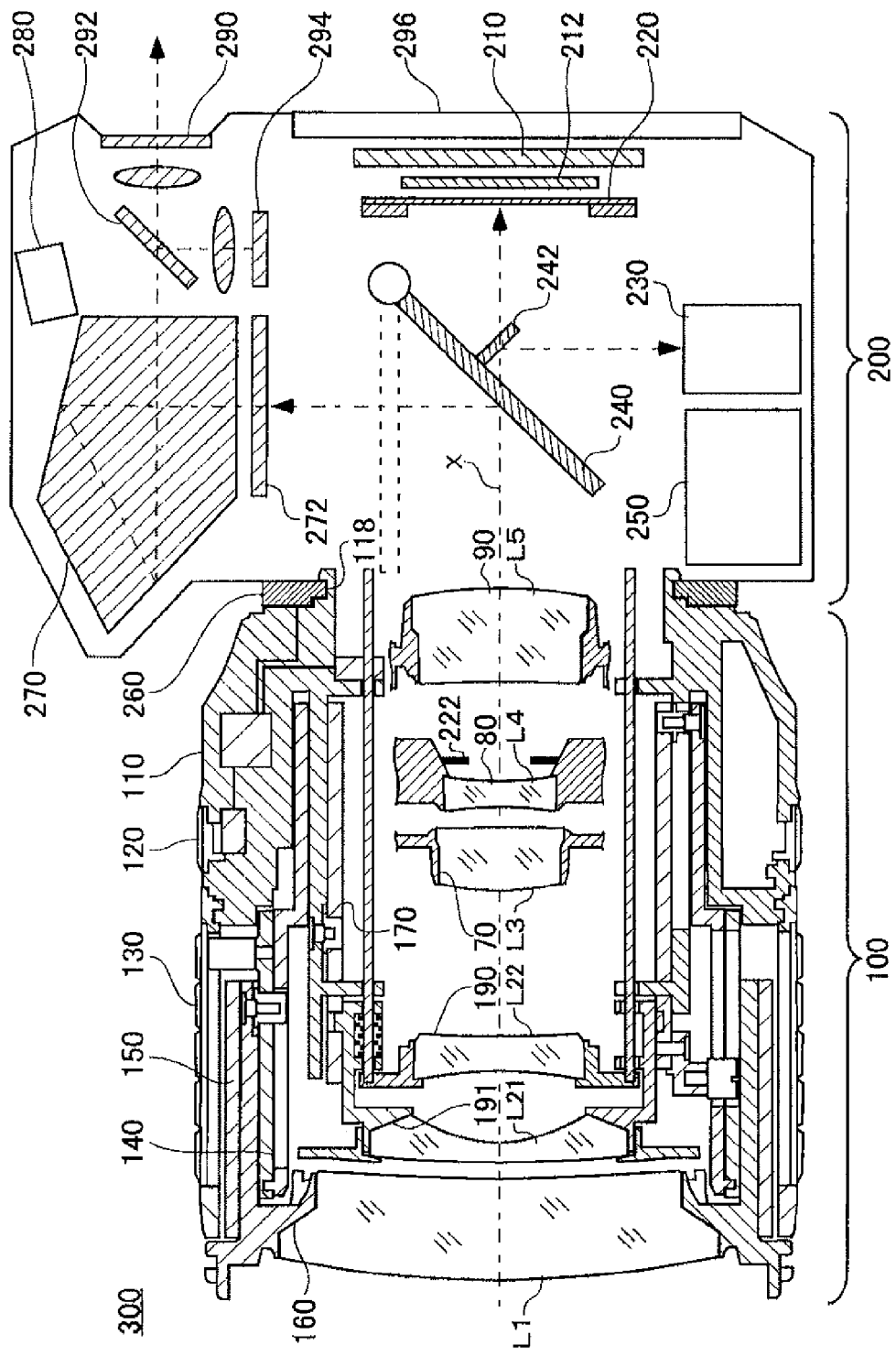
FIG. 9 is a schematic view of an image capturing apparatus 300.

FIG. 9 is a schematic view of an image capturing apparatus 300 provided with the lens barrel 100. In order to prevent FIG. 9 from being overly complex, an abbreviated view of the lens barrel 100 is shown. However, the lens barrel 100 shown in FIG. 9 has the same configuration the lens barrel 100 described in FIGS. 5 to 7. Therefore, components that are the same as those in FIGS. 5 to 7 are given the same reference numerals and redundant explanation is omitted.

The image capturing apparatus 300 includes the lens barrel 100 and an image capturing unit 200. The lens barrel 100 is detachably mounted on a mount section 260 of the image capturing unit 200.

The lens barrel 100 mounted in the image capturing apparatus 300 is electrically connected to the image capturing unit 200 via connection terminals, not shown. In this way, the lens barrel 100 receives power from the image capturing unit 200. Furthermore, signals are transmitted from the lens barrel 100 to the image capturing unit 200.

The image capturing unit 200 houses a main control section 250 and an optical system that includes a main mirror 240, a pentaprism 270, and an ocular optical system 290. The main mirror 240 moves between a standby position, in which the main mirror 240 is oriented diagonally in the optical path of incident light through the optical system of the lens barrel 100, and an image capture position, which is shown by the dotted line in FIG. 9 and in which the main mirror 240 is raised out of the optical path of the incident light.

When in the standby position, the main mirror 240 guides a majority of the incident light to a focusing screen 272 arranged thereabove. The focusing screen 272 is arranged at a position to form an image when the optical system of the lens barrel 100 is focused, and causes this image to be visible.

The image formed by the focusing screen 272 can be seen from the ocular optical system 290 via the pentaprism 270. Therefore, the image on the focusing screen 272 can be seen as a normal image from the ocular optical system 290.

A half mirror 292 is arranged between the pentaprism 270 and the ocular optical system 290. The half mirror 292 superimposes the display image formed by the finder LCD 294 onto the image of the focusing screen 272. As a result, the image seen at the output end of the ocular optical system 290 is a combination of the image of the focusing screen 272 and the image of the finder LCD 294. The finder LCD 294 displays information concerning image capturing conditions, setting conditions, and the like of the image capturing apparatus 300.

A portion of the light output from the pentaprism 270 is guided to the photometric unit 280. The photometric unit 280 measures the intensity of the light and a distribution or the like thereof, and these measurement results are referenced when determining the image capturing conditions.

The back surface of the main mirror 240, which is opposite the incident surface that receives the incident light, has a secondary minor 242. The secondary mirror 242 guides a portion of the incident light passing through the main mirror 240 to a focal point detection apparatus 230 positioned therebelow. Therefore, when the main mirror 240 is in the standby position, the focal point detection apparatus 230 detects a focal adjustment state of the optical system. When the main mirror 240 moves to the image capture position, the secondary mirror 242 also moves out of the optical path of the incident light.

A shutter 220, an optical filter 212, and an image capturing element 210 are arranged on the optical axis behind the main mirror 240 relative to a direction of the incident light from the lens barrel 100. When the shutter 220 is open, the main mirror 240 moves to the image capture position immediately therebefore, and so the incident light progresses to be incident to the image capturing element 210. As a result, the image formed by the incident light is converted into an electric signal by the image capturing element 210.

The image capturing unit 200 is provided with a main LCD 296 facing outward on a back surface of the lens barrel 100. The main LCD 296 displays various types of setting information concerning the image capturing unit 200, and also displays the image formed by the image capturing element 210 when the main mirror 240 is in the image capture position.

The main control section 250 performs overall control of the various operations described above. Furthermore, an auto-focus mechanism can be formed to drive the lens barrel 100 while referencing information concerning the distance to a subject as detected by the focal point detection apparatus 230 of the image capturing unit 200. As another example, an auto-focus mechanism can be formed by having the focal point detection apparatus 230 reference the movement amount of the lens barrel 100.

The main control section 250 also controls the opening and closing of a diaphragm apparatus 222 by exchanging information with a microprocessor of the lens barrel 100. The main control section 250 also provides automatic exposure, scene mode execution, bracket image capturing, or the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A lens barrel comprising:
a fixed cylinder;
an optical system having a first optical component that moves relative to the fixed cylinder;
a first holding frame that holds the first optical component;
a guide axle that extends parallel to an optical axis of the optical system and is integrally connected to the first holding frame such that the guide axle moves integrally with the first holding frame in the direction of the optical axis;
a supporting section that supports the guide axle, having a fitting hole in which the guide axle fits such that the guide axle is movable relative to the fixed cylinder in the direction of the optical axis;
a linear drive unit operable to move the guide axle in the direction of the optical axis and to hold the guide axle; and
a holding cylinder that holds the linear drive unit, the holding cylinder being movable relative to the fixed cylinder in the direction of the optical axis while the linear drive unit is holding the guide axle.

2. The lens barrel according to claim 1, wherein the holding cylinder moves relative to the fixed cylinder when the optical system scales.

3. The lens barrel according to claim 2, comprising a drive ring that has one of a cam groove oriented diagonal to the optical axis and a cam pin that engages with the cam groove, and that rotates around the optical axis when the optical system scales, wherein
the holding cylinder has an other of the cam groove and the cam pin, and moves in the direction of the optical axis during scaling.

4. The lens barrel according to claim 3, wherein the cam pin is arranged near the guide axle in a circumferential direction of the first optical component.

5. The lens barrel according to claim 1, wherein the fitting hole has a shape that is complementary to a shape of the peripheral surface of the guide axle.

6. The lens barrel according to claim 5, wherein the holding cylinder has a pair of fitting members that are arranged to sandwich the linear drive unit in the direction of the optical axis, and
each fitting member has a fitting hole with a shape that is complementary to the shape of the peripheral surface of the guide axle.

7. The lens barrel according to claim 1, wherein the optical system has a second optical component in addition to the first optical component, and
the holding cylinder comprises a second holding frame that holds the linear drive unit and the second optical component, and
the lens barrel further comprises a switching section that switches between a state in which the guide axle moves relative to the linear drive unit and a state in which the guide axle is held to prevent movement of the guide axle relative to the linear drive unit.

8. The lens barrel according to claim 7, further comprising a drive ring that engages with the second holding frame via a cam groove and rotates around the optical axis when the optical system scales.

9. The lens barrel according to claim 8, wherein at least one of the linear drive unit and the portion of the second holding frame engaged with the drive ring is positioned near the guide axle.

10. The lens barrel according to claim 7, wherein the second holding frame has a pair of insertion members that are arranged to sandwich the linear drive unit in the direction of the optical axis, and
each insertion member has an insertion hole with a shape that is complementary to a shape of a peripheral surface of the guide axle.

11. The lens barrel according to claim 7, wherein the guide axle is inserted through an insertion hole having a shape that is complementary to the shape of the peripheral surface of the guide axle, and is movable relative to the insertion hole in the direction of the optical axis.

12. The lens barrel according to claim 1, comprising:
an operation ring that is operated from outside the lens barrel to rotate around the optical axis; and
a rotation detector that detects a rotation amount of the operation ring, wherein
the linear drive unit moves the guide axle in the direction of the optical axis according to the rotation amount detected by the rotation detector.

13. The lens barrel according to claim 1, further comprising:
a linear motion detector that detects a movement amount of the guide axle driven by the linear drive unit; and
a control unit that controls a drive amount of the linear drive unit according to a detection result from the linear motion detector.

14. The lens barrel according to claim 1, wherein
at least a portion of the linear drive unit faces at least a portion of the guide axle.

15. An image capturing apparatus comprising:
the lens barrel according to claim 1; and
an image capturing unit that records an image formed by the lens barrel.

16. A method of manufacturing a lens barrel, the method comprising:
providing an optical system having a first optical component such that the optical component is movable relative to a fixed cylinder;
providing a first holding frame for holding the first optical component;
providing a guide axle that extends parallel to an optical axis of the optical system and is integrally connected to the first holding frame such that the guide axle moves integrally with the first holding frame in the direction of the optical axis;
providing a supporting section for supporting the guide axle, the supporting section having a fitting hole in which the guide axle fits such that the guide axle is movable relative to the fixed cylinder in the direction of the optical axis;
providing a linear drive unit operable to move the guide axle in the direction of the optical axis and to hold the guide axle; and
providing a holding cylinder for holding the linear drive unit such that the holding cylinder is movable relative to the fixed cylinder in the direction of the optical axis while the linear drive unit is holding the guide axle.

17. The method according to claim 16, wherein
the holding cylinder moves relative to the fixed cylinder when the optical system scales.

18. The method according to claim 17, comprising providing a drive ring that has one of a cam groove oriented diagonal to the optical axis and a cam pin that engages with the cam groove, and that rotates around the optical axis when the optical system scales, wherein
the holding cylinder has an other of the cam groove and the cam pin, and moves in the direction of the optical axis during scaling.

19. The method according to claim 18, wherein
the cam pin is arranged near the guide axle in a circumferential direction of the first optical component.

20. The method according to claim 16, wherein
the fitting hole has a shape that is complementary to a shape of the peripheral surface of the guide axle.

21. The method according to claim 20, wherein
the holding cylinder has a pair of fitting members that are arranged to sandwich the linear drive unit in the direction of the optical axis, and
each fitting member has a fitting hole with a shape that is complementary to the shape of the peripheral surface of the guide axle.

22. The method according to claim 16, wherein
the optical system has a second optical component in addition to the first optical component, and
the holding cylinder comprises a second holding frame that holds the linear drive unit and the second optical component, and
the method further comprises providing a switching section for switching between a state in which the guide axle moves relative to the linear drive unit and a state in which the guide axle is held to prevent movement of the guide axle relative to the linear drive unit.

23. The method according to claim 22, further comprising providing a drive ring that engages with the second holding frame via a cam groove and rotates around the optical axis when the optical system scales.

24. The method according to claim 23, wherein
at least one of the linear drive unit and the portion of the second holding frame engaged with the drive ring is positioned near the guide axle.

25. The method according to claim 22, wherein
the second holding frame has a pair of insertion members that are arranged to sandwich the linear drive unit in the direction of the optical axis, and
each insertion member has an insertion hole with a shape that is complementary to a shape of a peripheral surface of the guide axle.

26. The method according to claim 22, wherein
the guide axle is inserted through an insertion hole having a shape that is complementary to the shape of the peripheral surface of the guide axle, and is movable relative to the insertion hole in the direction of the optical axis.

27. The method according to claim 16, comprising:
providing an operation ring that is operated from outside the lens barrel to rotate around the optical axis; and
providing a rotation detector for detecting a rotation amount of the operation ring, wherein
the linear drive unit moves the guide axle in the direction of the optical axis according to the rotation amount detected by the rotation detector.

28. The method according to claim 16, further comprising:
providing a linear motion detector for detecting a movement amount of the guide axle driven by the linear drive unit; and
providing a control unit for controlling a drive amount of the linear drive unit according to a detection result from the linear motion detector.

29. The method according to claim 16, wherein
at least a portion of the linear drive unit faces at least a portion of the guide axle.

30. A method of manufacturing an image capturing apparatus, the method comprising:
providing the lens barrel manufactured by the method according to claim 16; and
providing an image capturing unit for recording an image formed by the lens barrel.

31. A method of manufacturing an image capturing apparatus, the method comprising:
manufacturing a lens barrel by the method according to claim 16; and
providing an image capturing unit for recording an image formed by the lens barrel.

* * * * *